UNITED STATES PATENT OFFICE.

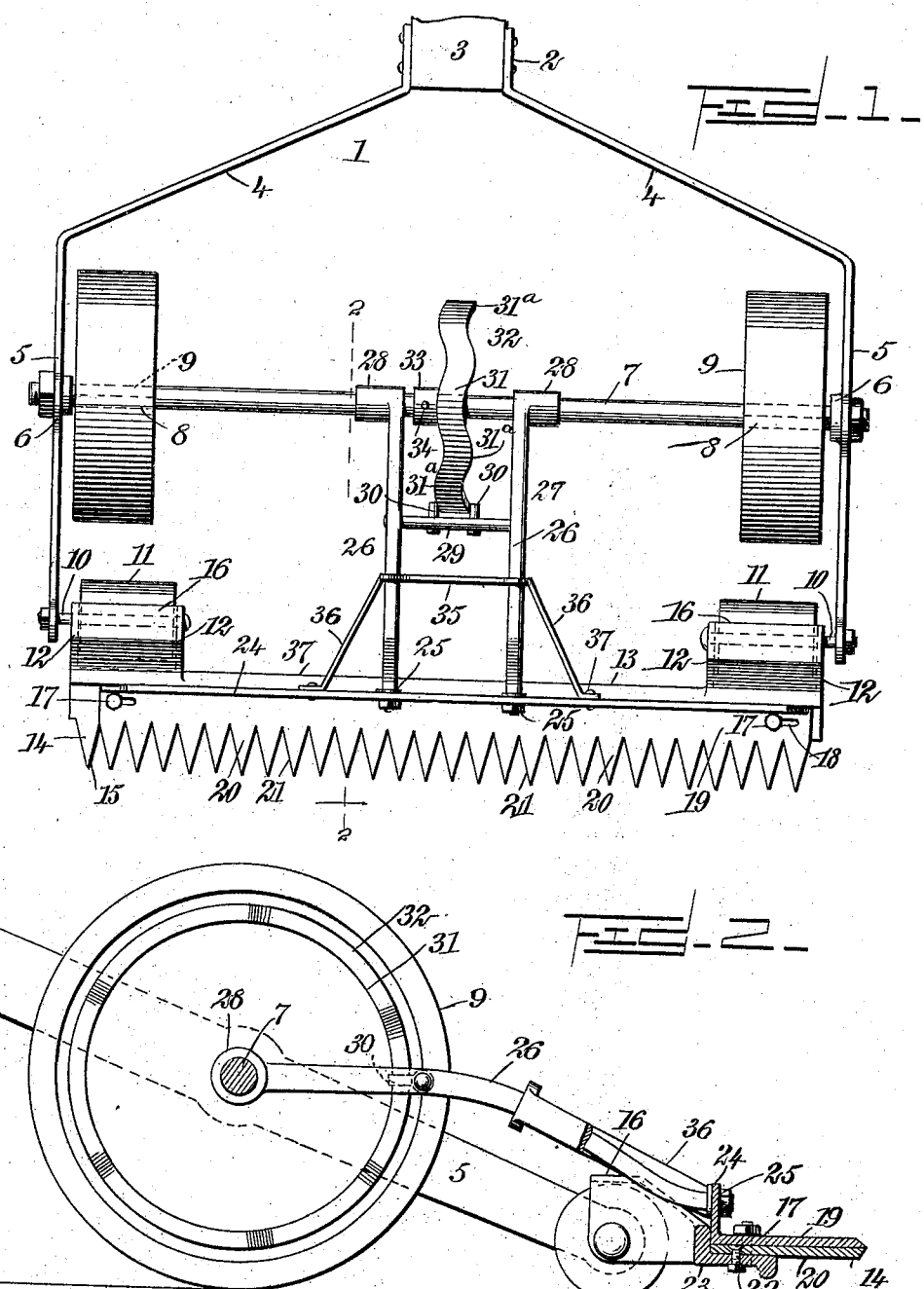

HOWELL P. TERRY, OF ELIZABETH, NEW JERSEY, ASSIGNOR TO GEORGE F. CORNWELL, OF BROOKLYN, NEW YORK.

LAWN-MOWER.

No. 815,132.     Specification of Letters Patent.     Patented March 13, 1906.

Application filed June 7, 1905. Serial No. 264,075.

*To all whom it may concern:*

Be it known that I, HOWELL P. TERRY, a citizen of the United States, and a resident of Elizabeth, in the county of Union and State of New Jersey, have invented a new and Improved Lawn-Mower, of which the following is a full, clear, and exact description.

This invention relates to lawn-mowers; and it consists, substantially, in the details of construction and combinations of parts hereinafter more particularly described, and pointed out in the claims.

The invention has reference more especially to hand-propelled lawn-mowers; and one of the principal objects thereof is to provide a structure of this kind of an embodiment to overcome the numerous disadvantages and objections encountered in the use of many other structures hitherto devised for similar purposes.

A further object is to provide a lawn-mower which is both simple in construction and comparatively cheap to manufacture, besides being light in weight and easily manipulated and possessing the capacity for long and repeated service.

The above and additional objects are attained by means substantially such as are illustrated in the accompanying drawings, in which—

Figure 1 is a top plan view of a lawn-mower embodying my improvements; and Fig. 2 is an enlarged side view thereof, partly in section, on the line 2 2 of Fig. 1.

Before proceeding with a more detailed description it may be stated that in the form of my improvements herein shown I provide a supporting frame or yoke for the structure, in which is supported a shaft for the main driving-wheels of the structure and combined with which is a rigid or stationary cutter or knife, together with a reciprocatory cutter or knife, special means being employed between the aforesaid shaft and said reciprocatory cutter or knife by which the latter is operated in the ordinary propulsion of the machine over a lawn or other surface.

Reference being had to the drawings by the designating characters thereon, 1 designates as an entirety the supporting frame or yoke of my improved lawn-mower, the same being adapted at 2 for the attachment thereto of an ordinary operating-handle 3 and comprising laterally-diverging members 4, terminating with forwardly-projecting parallel side members 5. (See Fig. 1.) Mounted in oppositely-disposed bearings 6, provided therefor in said parallel side members 5 of the frame or yoke, are the journals of a shaft 7, which are preferably squared for a suitable distance from their ends, as indicated at 8 in Fig. 1, for the attachment or fastening thereto of the main propelling-wheels 9 of the machine, it being apparent that the said shaft and wheels rotate together or in unison as the said wheels are propelled over the surface of the ground. Mounted at the ends or forward extremities of the aforesaid parallel side members 5 of the frame or yoke 1 of the machine are inwardly-extending short shafts 10, which are rigid with the side members 5 and upon which are journaled the smaller propelling-wheels 11, it being noted in Fig. 2 that in the operation of the machine the said frame or yoke thereof is disposed at such forward and downward inclination as that the peripheral portions of the smaller driving-wheels 11 are caused also to move along the surface of the ground in the desired manner by which to effect or obtain the results sought.

Rigid with each of the short shafts 10 and extending forwardly thereof are duplicate members 12, disposed at either end of a stationary cutter or knife 13, said stationary cutter or knife extending transversely of the machine, as shown, and being preferably provided along the forward edge thereof with a series of teeth 14, having cutting edges 15, each set of said members 12 also having rigid therewith a hood 16, extending upwardly and rearwardly and partially concealing one of the smaller driving-wheels 11, said hoods serving to protect the said wheels 11 and to prevent the bearings and supports thereof from becoming clogged up with dirt or grass. The stationary cutter or knife 13 is provided at or near the ends of the upper surface thereof with pins or bolts 17, extending all the way through said cutter or knife and through longitudinally-extending slots 18, formed in a longitudinally-reciprocatory cutter or knife 19, and is also provided at the forward edge thereof with a series of teeth 20, having cutting edges 21 coöperating with the aforesaid cutting edges 15 of the teeth of the stationary cutter or knife. This latter cutter or knife is preferably removable for the purpose of repair or sharpening of the teeth thereof whenever desired, and in the use of the machine the same is rigidly held in position by means of screws such as indicated at 22, Fig. 2, extending through the same and through the integral rigid supports 23 therefor from the under side. The longitudinally-reciprocatory cutter or knife 19 is provided along the inner edge thereof with an upstanding flange 24, rigidly secured to which at 25 are the forward ends of parallel and preferably curved members 26 of a reciprocatory yoke 27, the upper and rearward ends of said parallel curved members 26 being provided with preferably lateral sleeves 28, movably mounted upon the aforesaid shaft 7 of the machine. The said reciprocatory yoke 27 may be operated in various ways; but preferably I provide a connecting member 29 between the parallel members 26 thereof, having duplicate offsets or pins 30 projecting rearwardly therefrom and forming between them a guide for the concentric rim 31 of a circular rotatory cam 32, having rigid therewith a collar 33, which is secured to the shaft 7 intermediate of the sleeves 28 of the parallel members 26 of the reciprocatory yoke 27 by means of a set-screw 34 or in any other suitable way, said rim having at the edge thereof lateral concentrically-disposed alternating projections 31$^a$, as shown.

Preferably the parallel members 26 of the reciprocatory yoke 27 are also rigidly connected together by means of a longitudinal brace 35, from the ends of which extend laterally-inclined members 36, the ends of which are also secured at 37 to the aforesaid upstanding flange 24 of the said reciprocatory cutter or knife 19. The hereinbefore-mentioned supports 23 for the stationary cutter or knife are integral with and extend between the hereinbefore-mentioned members 12 of each hood for the smaller propelling-wheels 11, and it is apparent that the parts constituting my improvements are simple in construction and organization as well as compact and easily accessible either for the purposes of cleaning or repair.

From the foregoing it will be seen that when the machine is propelled over a ground-surface in the ordinary way for the purpose of cutting grass and the like the rotary motion imparted to the cam 32 will be communicated to the reciprocatory yoke 27 by means of the hereinbefore-mentioned alternating projections 31$^a$ on the rim of the cam working in contact with the parallel offsets from the connecting member 29 between the parallel members 26 of said yoke, and in this way a corresponding reciprocatory motion will be communicated to the aforesaid movable cutter or knife, all of which, it is thought, will be apparent. The movements of the movable cutter or knife are limited by the length of the slots 18 therein, as will be understood, and as the cutting edges of the teeth of this movable cutter or knife are carried across the teeth of the stationary cutter or knife the blades of grass will be trimmed with an effective shearing cut, which is desirable in this class of machines.

The machine is very light in its entirety, and consequently can be lifted or carried about with ease and may also be operated with but little fatigue to the operator.

Having thus described my invention, I claim as new and desire to secure by Letters Patent—

1. A lawn-mower, comprising a frame, a stationary cutter rigid therewith, a movable cutter coöperating with said stationary cutter, main propelling-wheels, a shaft connecting the same, means movable on said shaft, having rigid connection with the movable cutter, and means carried by the shaft for imparting reciprocating motion to said first-named means.

2. A lawn-mower, comprising a frame, a stationary cutter rigid therewith, a movable cutter coöperating with said stationary cutter, main propelling-wheels, a shaft connecting the same, means movable on said shaft, having rigid connection with the movable cutter, and means carried by the shaft for imparting reciprocating motion to said first-named means, said second-named means embodying a cam having alternating projections on its opposite sides.

3. A lawn-mower, comprising a frame having forwardly-extending parallel members, a shaft mounted to turn in said members and provided with propelling-wheels, forwardly-disposed smaller propelling-wheels, the bearings for which are rigid with the ends of said parallel members, hoods for the smaller wheels having side members rigid with the bearings thereof, a stationary cutter rigid with the hoods and connecting the same, a movable cutter coöperating with said stationary cutter, and means from the shaft for imparting a reciprocatory motion to said movable cutter.

4. A lawn-mower, comprising a frame having forwardly-extending parallel members, a shaft mounted to turn in said members and provided with propelling-wheels, forwardly-disposed smaller propelling-wheels, the bearings for which are rigid with the ends of said parallel members, hoods for the smaller rollers having side members rigid with the bearings therefor, a stationary cutter rigid with the hoods and connecting the same, a movable cutter coöperating with said stationary cutter, and means from the shaft for imparting a reciprocatory motion to said movable cutter, embodying a yoke having parallel members rigid with the movable knife and provided with sleeves mounted on and movable lengthwise of the shaft.

5. A lawn-mower, comprising a supporting-frame and sets of propelling-wheels mounted therein, a rotatable shaft connecting the wheels of one set, a stationary cutter, a movable cutter coöperating therewith, a movable yoke having rigid connection with the movable cutter and provided with sleeves having longitudinal movement on the shaft, and a cam rigid with the shaft and having a rim provided with alternating laterally-disposed projections on its opposite sides and engaging with parts of the yoke to reciprocate both the latter and the said movable cutter.

6. A lawn-mower, comprising a supporting-frame and sets of propelling-wheels mounted therein, a rotatable shaft connecting the wheels of one set, a stationary cutter, a movable cutter coöperating therewith, a movable yoke having rigid connection with the movable cutter and provided with sleeves having longitudinal movement on the shaft, and a cam rigid with the shaft and having a rim provided with alternating laterally-disposed projections on its opposite sides and engaging with parts of the yoke which reciprocate both the latter and the said movable cutter, said yoke being constructed of curved parallel members and a connecting-brace therebetween having members also secured to the movable knife.

In testimony whereof I have signed my name to this specification in the presence of two subscribing witnesses.

HOWELL P. TERRY.

Witnesses:
E. EVERETT ELLIS,
JNO. M. RITTER.